United States Patent
Zhou et al.

(10) Patent No.: US 9,807,009 B2
(45) Date of Patent: Oct. 31, 2017

(54) SYSTEM AND METHOD FOR PROVIDING CONGESTION NOTIFICATION IN LAYER 3 NETWORKS

(71) Applicant: Google Inc., Mountain View, CA (US)

(72) Inventors: Junlan Zhou, Sunnyvale, CA (US); Zhengrong Ji, Sunnyvale, CA (US); Jiangbo Li, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 90 days.

(21) Appl. No.: 14/676,053

(22) Filed: Apr. 1, 2015

(65) Prior Publication Data
US 2015/0372918 A1 Dec. 24, 2015

Related U.S. Application Data

(60) Provisional application No. 62/014,223, filed on Jun. 19, 2014.

(51) Int. Cl.
*H04L 12/801* (2013.01)
*H04L 12/825* (2013.01)
*H04L 12/721* (2013.01)

(52) U.S. Cl.
CPC ............ *H04L 47/11* (2013.01); *H04L 47/13* (2013.01); *H04L 47/263* (2013.01); *H04L 45/66* (2013.01); *H04L 47/33* (2013.01)

(58) Field of Classification Search
None
See application file for complete search history.

(56) References Cited

U.S. PATENT DOCUMENTS

| 8,160,063 B2 | 4/2012 | Maltz et al. |
| 8,811,183 B1 * | 8/2014 | Anand ............... H04L 49/25 370/237 |
| 9,282,041 B2 * | 3/2016 | Calavrezo ............ H04L 47/11 |
| 2006/0176810 A1 | 8/2006 | Kekki |

(Continued)

FOREIGN PATENT DOCUMENTS

| CN | 103368863 A | 10/2013 |
| EP | 2461529 A2 | 6/2012 |

OTHER PUBLICATIONS

Crisan et al., Datacenter Applications in Virtualized Networks: A Cross-layer Performance Study, manuscript received Jan. 15, 2013.

(Continued)

*Primary Examiner* — Anh Ngoc Nguyen
(74) *Attorney, Agent, or Firm* — McDermott Will & Emery LLP

(57) ABSTRACT

A system and method is provided for sending congestion notification messages through L3 networks. For example, a data packet is received at a first switch in a first fabric block of an L3 network, and the first switch performs source MAC tagging of the data packet. The data packet is then forwarded to a second switch in a second fabric block of the L3 network, and the source MAC tag is maintained by the second switch and any intermediate switches. The second switch determines, in response to receiving the data packet, whether it is congested, and generates a notification message if it is congested. The notification message is L2 forwarded to the first fabric block, and further forwarded from the first switch to a source of the data packet using ACL matching.

20 Claims, 6 Drawing Sheets

(56) References Cited

U.S. PATENT DOCUMENTS

| | | |
|---|---|---|
| 2006/0203730 A1 | 9/2006 | Zur |
| 2009/0052326 A1 | 2/2009 | Bergamasco et al. |
| 2010/0097934 A1 | 4/2010 | Hendel et al. |
| 2010/0217936 A1* | 8/2010 | Carmichael .......... C07D 217/08 711/118 |
| 2014/0211631 A1* | 7/2014 | Haramaty ............. H04L 47/122 370/237 |
| 2014/0269325 A1* | 9/2014 | Chrysos ................ H04L 47/115 370/237 |

OTHER PUBLICATIONS

International Search Report and Written Opinion dated Dec. 18, 2015 in PCT Application No. PCT/US2015/034684.

* cited by examiner

SYSTEM AND METHOD FOR PROVIDING CONGESTION NOTIFICATION IN LAYER 3 NETWORKS

CROSS REFERENCE TO RELATED APPLICATIONS

The present application claims the benefit of the filing date of U.S. Provisional Application No. 62/014,223, filed Jun. 19, 2014, the disclosure of which is incorporated herein by reference.

BACKGROUND

Quantized Congestion Notification (QCN) is a relatively new congestion management mechanism proposed for Ethernet. It allows switches to generate early congestion feedbacks to the traffic sources, which can then adapt their transmission rates to mitigate congestion and high latency. However, adoption of QCN in Layer 3 networks has been prohibited by challenges such as lack of support for tunneling, complexity, and high cost.

SUMMARY

A system and method is provided for sending congestion notification messages through L3 networks and implementation of QCN in L3 switches.

One aspect of the technology provides a method, comprising receiving a data packet at a first switch in a first fabric block of an L3 network, rewriting, by the first switch, information in a header of the data packet to identify at least one of the first switch and the first fabric block, wherein the information is not further modified by other switches forwarding the data packet, forwarding the data packet to a second switch in a second fabric block of the L3 network, determining, by the second switch in response to receiving the data packet, whether the second switch is congested, generating, at the second switch in response to the detected congestion, a notification message, forwarding the notification message to the first switch, and forwarding the notification message from the first switch to a source of the data packet.

Another aspect of the disclosure provides a method, comprising receiving a data packet at a first switch in a first fabric block of an L3 network, rewriting, by the first switch, information in a header of the data packet to identify at least one of the first switch and the first fabric block, wherein the information is not further modified by other switches forwarding the data packet, forwarding the data packet to a second switch, receiving a congestion notification message from the second switch, and forwarding the notification message from the first switch to a source of the data packet.

Yet another aspect of the disclosure provides a method, comprising receiving a data packet at a switch in a second fabric block of an L3 network, determining, by the switch in response to receiving the data packet, whether the switch is congested, generating, at the switch in response to the detected congestion, a notification message, and forwarding the notification message to a source of the data packet.

DETAILED DESCRIPTION

This disclosure provides for sending quantized congestion notification (QCN) messages in L3 networks, without requiring a change in switch hardware. In particular, an L2 forwarding overlay utilizes source media access control (MAC) tagging of data packets and hierarchical routing of QCN messages.

Source MAC tagging may be performed by switches in fabric blocks of the network, such as top of rack (TOR) switches or edge routers. For example, each TOR may rewrite the L2 header of host-generated data packets. The source MAC in the header uniquely identifies the TOR, and could be set to an IP prefix of the TOR. As another example, the edge router in a fabric block can perform source MAC tagging by encoding an identifier corresponding to the fabric block, such as the IP prefix, in the source MAC of data packets being forwarded. In either example, the switches forwarding the data packets, but not performing the tagging, keep the source MAC of the data packets unmodified.

The QCN message generated by a switch detecting congestion is hierarchically forwarded. For example, first the QCN message is L2 forwarded based on its destination MAC from the congested switch to the edge router or TOR performing the source MAC tagging. The L2 forwarding rules of the QCN message can be aggregated into a small set of access control list (ACL) rules. The QCN message is then forwarded from the edge router or TOR to the congestion source by ACL matching the QCN payload.

Figure 1:
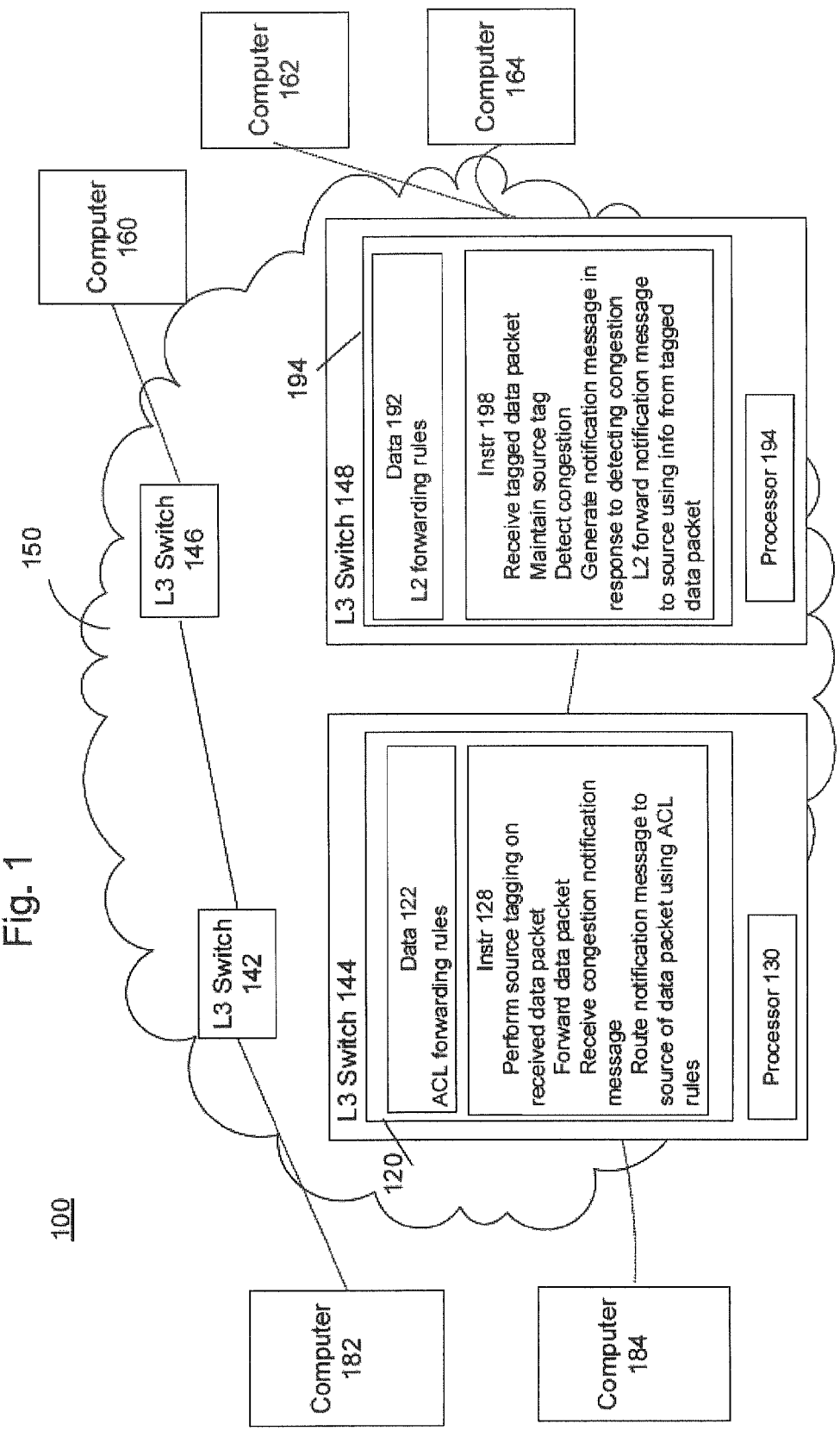
FIG. 1 is an example system diagram according to an aspect of the disclosure.

FIG. 1 illustrates an example network 150 that joins a plurality of computers 160, 162, 164, 182, 184. The network 150 may be, for example, a datacenter or any other collection of routers or other switching devices joining two or more host devices. The network 150 includes a plurality of layer 3 (L3) switches 142, 144, 146, 148. Each L3 switch may include a processor 130 and a memory 120 coupled to the processor 130. Each L3 switch 142-148 may further include one or more input ports for receiving data, such as packets or program updates, from other L3 switches or computing devices. Similarly, each L3 switch 142-148 may have one or more output ports for transmitting data through the network 150.

Each router may have a processor and a memory, such as memory 120 of the router 144, which stores data 122 and instructions 128, for example, for detecting congestion and notifying an offending traffic source of the congestion. For example, the L3 switch 144 samples received data packets and detects congestion based on the sampled packets. If congestion is detected, the L3 switch 144 assembles a notification message with an Internet Protocol (IP) header using the sampled packet. Example notification messages are described in further detail below with respect to FIGS. 2-4 and 6. The destination of the notification message is set to the source of the sampled packet, and the notification message is sent to an ingress port of the L3 switch 144 through which the sampled packet was received. Accordingly, for example, if the computer 182 is the offending traffic source, the notification message is forwarded to the computer 182 through the L3 switch 142. In response, the computer 182 may reduce its packet transmission rate.

The memory 120 stores information accessible by processor 130, including instructions 128, and data 122 that may be executed or otherwise used by the processor 130. The memory 120 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 128 may be any set of instructions to be executed directly (such as machine code) or indirectly (such as scripts) by the processor 130. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 122 may be retrieved, stored or modified by processor 130 in accordance with the instructions 128. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 130 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

Similar to the switch 144, the switch 148 may also include memory 194 and a processor 190, which may be structured similarly to the memory 120 and processor 130 discussed above. The memory 194 may further include data 192 and instructions 198 for, for example, detecting congestion, generating a notification message, and L2 forwarding the notification message through the L3 network to a congestion source.

The computers 160, 162, 164, 182, 184 may be any of a variety of computing devices, including servers in a datacenter, personal digital assistants (PDAs), laptops, tablet PCs, netbooks, PCs, etc. These devices may be connected to the network 150 via a wired connection, such as through a modem, or wirelessly, such as through an access point in communication with one of the routers 142-148. Although only a few computers are depicted in FIG. 1, it should be appreciated that the system can include a large number of connected computers, with each different computer being at a different node of the network 150. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Generally, the L3 switch 144 receives a data packet and performs source tagging on the data packet, such that the source tag is maintained by further switches as the data packet is routed. The switch 144 is further configured to receive a notification message from another switch, and to forward the notification message to a source of the data packet using L2 forwarding rules aggregated into ACL rules. The L3 switch 148 may be in a separate fabric block from the switch 148. The switch 148 may be configured to receive the data packet from the switch 144, detect congestion based on the data packet, and generate a congestion notification message in response. The switch 148 is further configured to transmit the notification message to the traffic source, for example through the switch 144, using L2 forwarding. Such operations are discussed in further detail below.

Figure 2:
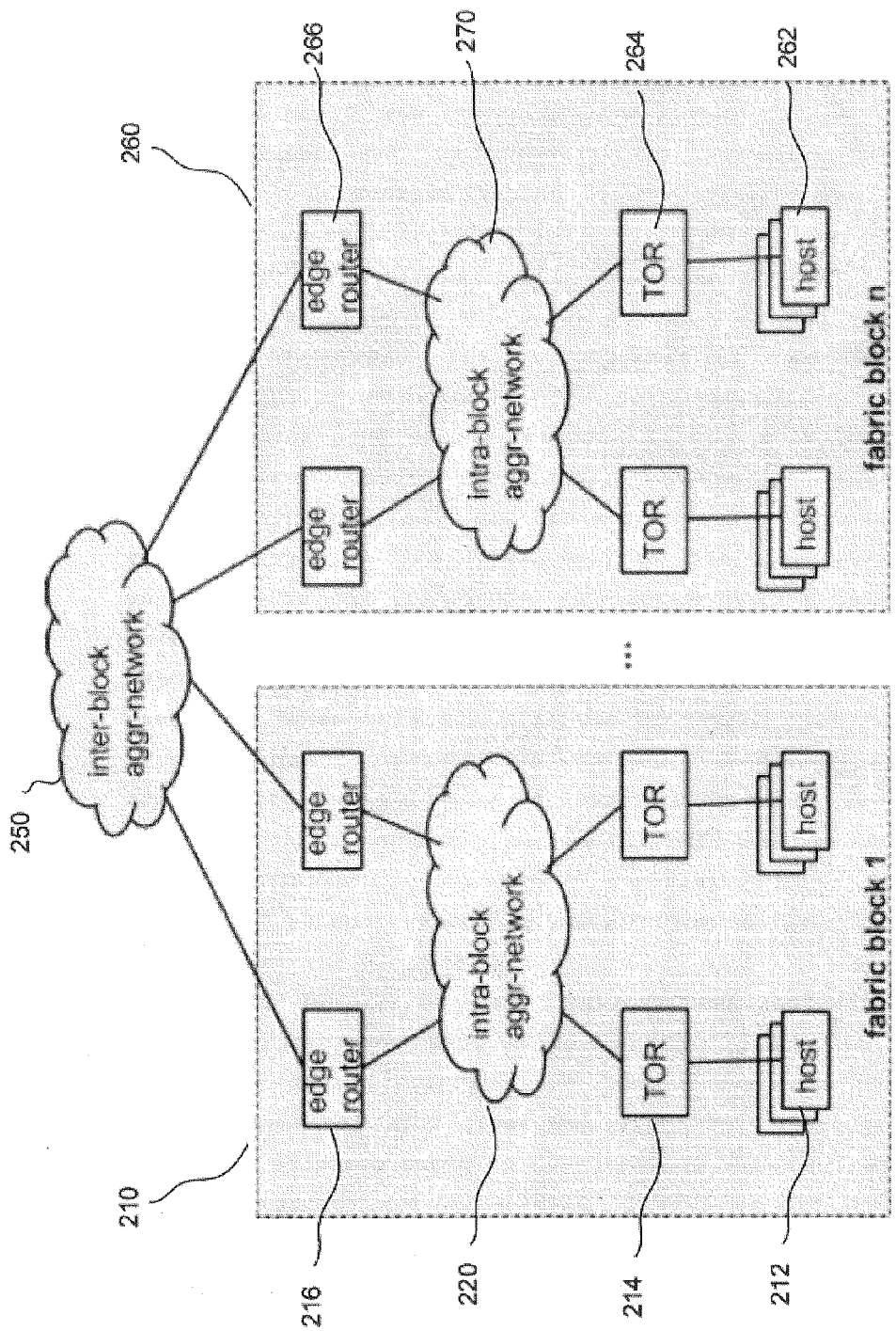
FIG. 2 is another example system diagram according to aspects of the disclosure.

FIG. 2 illustrates an example data center network 200. The network 300 has a hierarchical topology, with multiple fabric blocks 210, 260 interconnected by an inter-block network 250. The inter-block network 250 may include, for example, one or more switching devices, such as routers, spines, or the like. While only two fabric blocks 210, 260 are shown in FIG. 2, the network 200 may include any number of fabric blocks.

Each fabric block 210, 260 may include one or more host devices 212, 262 in a lowest level of the topology, with one or more top of rack (TOR) switches 214, 264 connected to the host devices in a next level. One or more edge routers 216, 266 may reside at an edge of each fabric block 210, 260. The edge routers 216, 266 may be connected to the TOR switches 214, 264 by, for example, an intra-block network 220, 270. Each intra-block network 220, 270 may include one or more switches and/or other network device used for transmitting packets. While the fabric blocks 210, 260 are shown as including only a few levels of hardware, it should be understood that additional or fewer levels may be included in the hierarchy.

In data center networks of hierarchical topology such as the network 200, traffic among the TOR switches is L3 forwarded based on packet Internet Protocol (IP) header. For example, a packet may be routed from the host 212 in fabric block 210 to the host 262 in the fabric block 260 by traveling through the TOR 214, intra-block network 220, edge router 216, inter-block network 250, edge router 266, intra-block network 270, and TOR 264, respectively. Such packet may have an IPv4 or IPv6 header providing information for routing the packets through the network 200 from one hop to the next.

QCN messages are typically Layer 2 (L2) packets. When a data packet contributes to congestion of an L2 network node, a source address (e.g., media access control (MAC) address) of the data packet is copied into the QCN message packet as a destination address for the QCN message. A payload of the QCN message includes the first 64 B of the data packet contributing to the congestion. To enable use of QCN messages in L3 networks, such as the network 200, an L2 forwarding overlay is provided. The L2 forwarding overlay employs source MAC tagging of data packets and hierarchical routing of the QCN messages. Using the forwarding overlay, congestion may be detected and reported by any of the TOR switches 214, 264 or edge routers 216, 266 in the network 200.

Source MAC tagging may be performed by, for example, one or more of the TORs in each fabric block, or one or more of the edge routers in each fabric block. For example, a node designated to perform source MAC tagging may be programmed to tag data packets with its MAC address. In some examples, one node may be designated to perform source MAC tagging in each fabric block. In other examples, each node in a given level of each fabric block may be designated to perform the tagging. For example, if each edge router in the fabric block 210 performs source MAC tagging, data packets transmitted through the network will be tagged regardless of which path they take through the fabric block 210.

Where source MAC tagging of data packets is performed by the TOR 214, each TOR rewrites the L2 header of data packets generated by the host 212. For example, because the source MAC in the L2 header uniquely identifies the TOR, the source MAC may be set to the IP prefix of the TOR.

Where source MAC tagging is performed by the edge router 216, an identifier of the corresponding fabric block 210 is encoded in the new source MAC of data packets being forwarded. For example, the IP prefix of the fabric block 210 may be encoded in the QCN packet.

Whether source MAC tagging is performed by a TOR switch or by an edge router, the other switches do not modify the source MAC of forwarded data packets. For example, if source MAC tagging is performed by the TOR 214 for packets being routed from the host 212 to the host 262, the switches 216, 266, and 264 forward the data packets, keeping the source MAC of data packets unmodified.

Hierarchical routing of the QCN message is performed within each fabric block 210, 260. Upon sensing congestion, a switch generates the QCN message. The destination MAC of such messages is copied from the source MAC of data packets triggering the congestion. The payload of the QCN message includes the IP header of these data packets. The QCN message is forwarded to the congestion source by a combination of L2 forwarding and access control list (ACL) forwarding.

The QCN message is first L2 forwarded based on its destination MAC from the congested switch to the edge router or TOR performing the source MAC tagging. If the IP prefix of the fabric block or TOR is used as the source MAC of data packets and thus the destination MAC of the QCN message, the L2 forwarding rules of the QCN message can be further aggregated into a small set of ACL rules. This works particularly well in data center network with hierarchically addressed hosts. For example, where each fabric block has a single IP prefix including the IP prefixes of all the TORs in the block, the L2 forwarding rules of the QCN message can be more readily aggregated into a smaller set of ACL rules.

The QCN message is then forwarded from the edge router or TOR performing the source MAC tagging to the congestion source, for example, by ACL matching of the QCN payload. For example, the IP address of the congestion source included in the QCN message payload is compared to the aggregated set of ACL forwarding rules, and the QCN message is routed to the congestion source using the matched ACL forwarding rules.

A major benefit of such hierarchical routing is that ACL forwarding is only needed within a fabric block, from the router performing the source MAC tagging of data packets to the congestion source. Additionally, the forwarding rules of the QCN message can be derived from forwarding rules of data traffic being routed from the switches to the congestion source.

Figure 3:
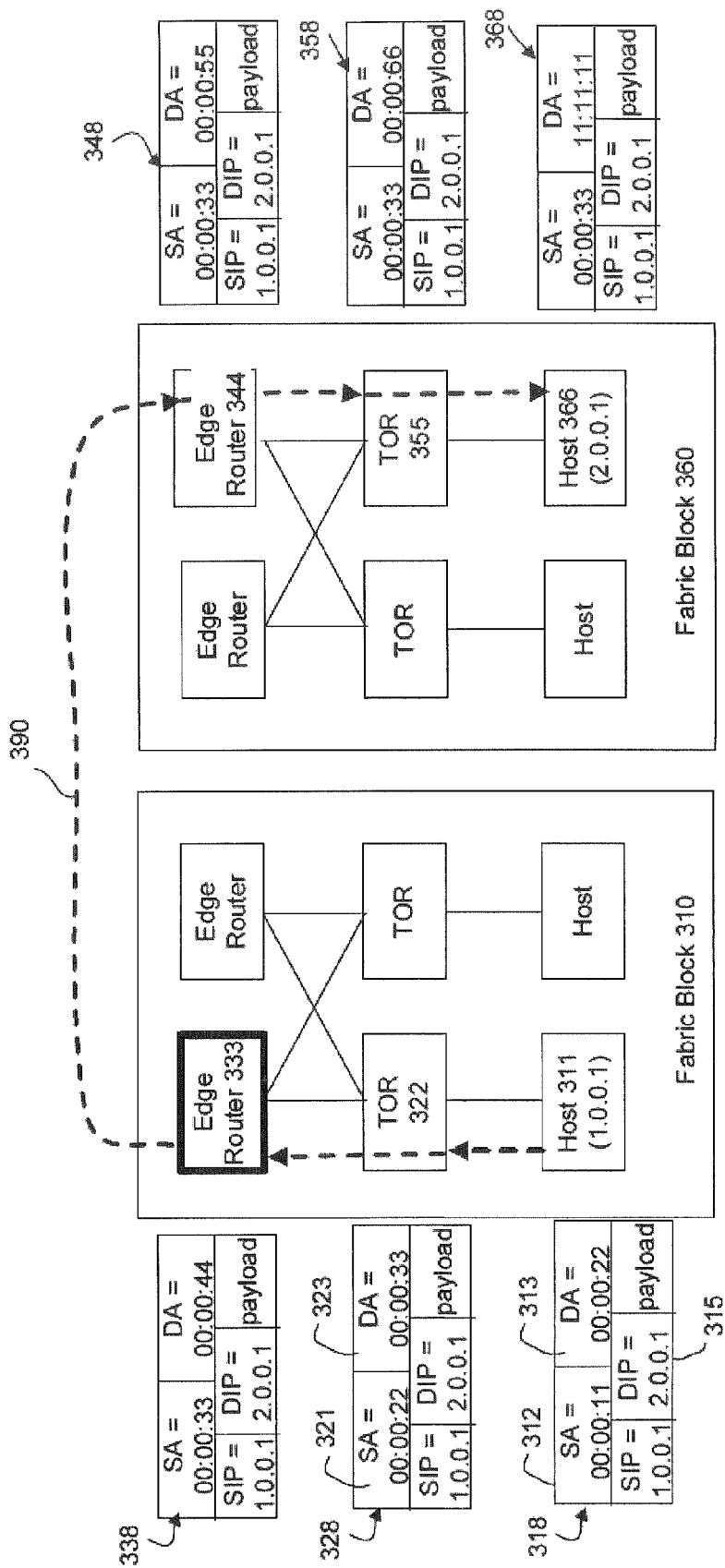
FIG. 3 illustrates an example of source address tagging according to aspects of the disclosure.
Figure 4:
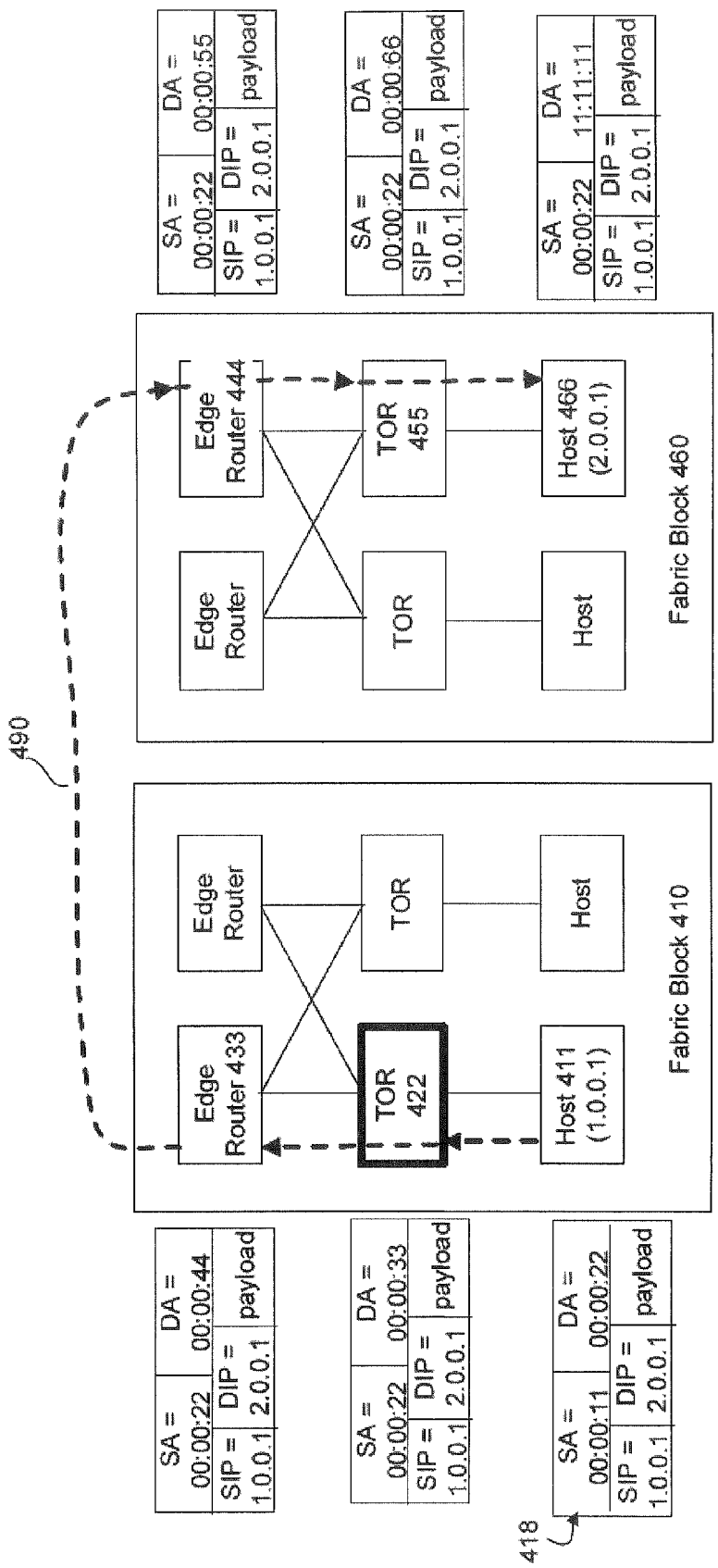
FIG. 4 illustrates another example of source address tagging according to aspects of the disclosure.

FIGS. 3 and 4 illustrate two examples of the L2 forwarding overlay for an L3 network. In both examples, there is a traffic flow between hosts in two different fabric blocks. In the 1st example shown in FIG. 3, source MAC tagging is performed by the TOR switch, while in the second example shown in FIG. 4, source MAC tagging is performed by the edge router.

As shown in FIG. 3, fabric block 310 includes host 311, TOR switch 322, and edge router 333. Fabric block 360 may be in communication with the fabric block 310 through, for example, an inter-block network as discussed in connection with FIG. 2. Fabric block 360 includes edge router 344, TOR switch 355, and host 366. Each of the fabric blocks 310, 360 may also include other network devices, such as additional switches and hosts, which are not discussed in the present example.

First host 311 sends a data packet 318 destined for second host 366, as indicated by the destination IP (DIP) address 315. The packet may be sent to the second host 366 through, for example, first TOR 322, first edge router 333, second edge router 344, and second TOR 355, as indicated by path 390. The packet 318 includes headers 312, 313 identifying a source address, such as a MAC address), and next hop destination address for the packet, respectively. For example, the source MAC address in header 312 corresponds to the first host 311, and the destination MAC address in header 313 corresponds to first TOR 322.

When the packet 318 reaches the first TOR 322, the first TOR 322 rewrites the header information. For example, as shown in updated packet 328, source address 321 is replaced with the MAC address of the first TOR 322. Moreover, destination address 323 is rewritten to the MAC address of the next hop, which is the first edge router 333.

In this example, the first edge router 333 performs source MAC tagging on the data packet. For example, the first edge router 333 rewrites header information similar to the rewrites performed by the first TOR 322. In particular, updated packet 338 includes the source MAC address of the first edge router 333, and the destination address of the second edge router 344. This source MAC uniquely identifies the first fabric block 310. However, the switches that will receive the packet 338 are programmed not to perform further rewrites of the source address header. For example, the second edge router 344 and second TOR 355 may be programmed to determine that the source address header 00:00:33 is a tag and should not be rewritten. Therefore, in updated packets 348, 358, 368, only the destination MAC address is rewritten and the source MAC address of the first edge router 333 is maintained.

In FIG. 4, first host 411 in first fabric block 410 sends data packet 418 for delivery to second host 466 in second data block 460. The data packet 418 may be sent along path 490, through first TOR 422, first edge router 433, second edge router 444, and second TOR 455.

In this example, the first TOR 422 performs the source MAC tagging of data packets. Accordingly, the TOR 422 rewrites the source address of the data packet header using its own MAC address, which uniquely identifies the source TOR. The first TOR 422 also rewrites the destination MAC address to be the MAC address of the first edge router 433. While the destination MAC address of the data packet is updated by each node as the packet travels to the second host 466, the tagged source MAC address is unchanged. For example, the first edge router 433, second edge router 444, and second TOR 455 may be programmed to maintain the tagged source MAC address and to only update the destination MAC address.

Figure 5:
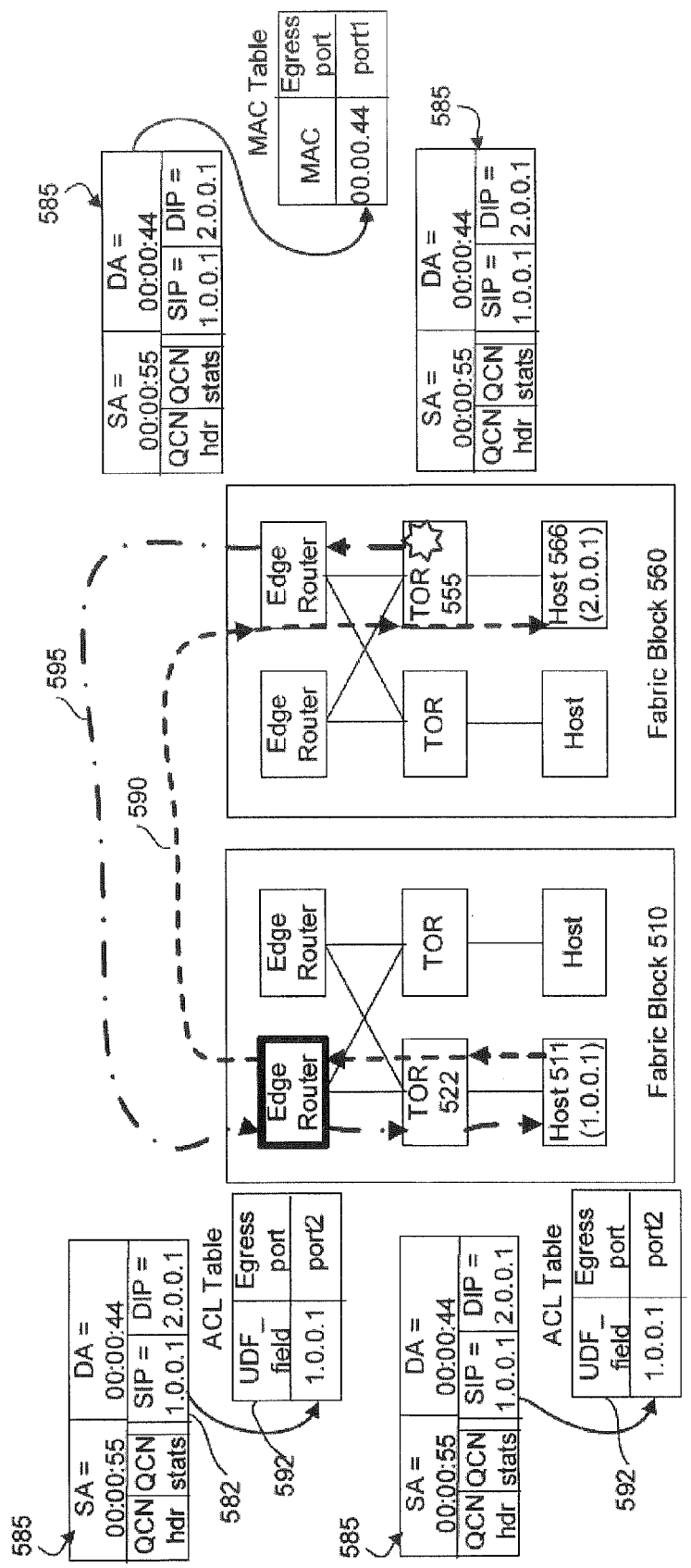
FIG. 5 illustrates an example of QCN message routing according to aspects of the disclosure.

FIG. 5 illustrates an example of determining congestion and forwarding a QCN message through an L3 network using the L2 forwarding overlay. In this example, the data traffic (not shown) sent along path 590 is tagged by first edge router 533 of source fabric block 510 with a source MAC of 00:00:00:00:00:44, which uniquely identifies the fabric block 510. This source MAC is maintained until the packet reaches destination host 566. However, congestion occurs in second TOR 555 connected to the destination host 566. Accordingly, the TOR 555 generates a QCN message 585 with the destination MAC set to the source MAC of data packets, which is 00:00:00:00:00:44 identifying source fabric block 510. Intermediate routers, such as second edge router 544 of fabric block 560, receives the QCN message and recognizes the MAC address as being from fabric block 510. Accordingly, the second edge router 544 L2 forwards the QCN message 585, for example via path 595, to one of edge routers, such as the first edge router 533, of fabric block 510.

Once the QCN message 585 reaches the fabric block 510, it is forwarded by the routers via ACL look up of the source IP in the original data packet header, which is included by the QCN message 585. For example, first edge router 533 and first TOR 522 forward the QCN message 585 to the source host 511, which is the source of the data packet for which congestion was detected. The edge router 533 and the TOR 522 forward the QCN message 585 using ACL rules which were generated from L2 QCN forwarding rules. Such ACL lookup may be implemented by setting up user-defined fields of ACL matching. For example, an offset of user defined field 592 is configured using an offset of source IP address 582 in the original data packet header included in the QCN message 585.

According to some examples, when source MAC tagging is performed, the IP address of the node performing the tagging is embedded into the source address. For example, referring to FIG. 5, if the IP address of the TOR 522 is 0a.0a.01.00/24, the TOR 522 will rewrite the source address to be 02:AA:0A:0A:01:00, such that the IP address is embedded into the source address. Moreover, "02:AA" may be a special value to identify a fake mac address. By embedding the IP address into the source address, one or more ACL rules may mask out more bits of the source address to aggregate the rules.

Figure 6:
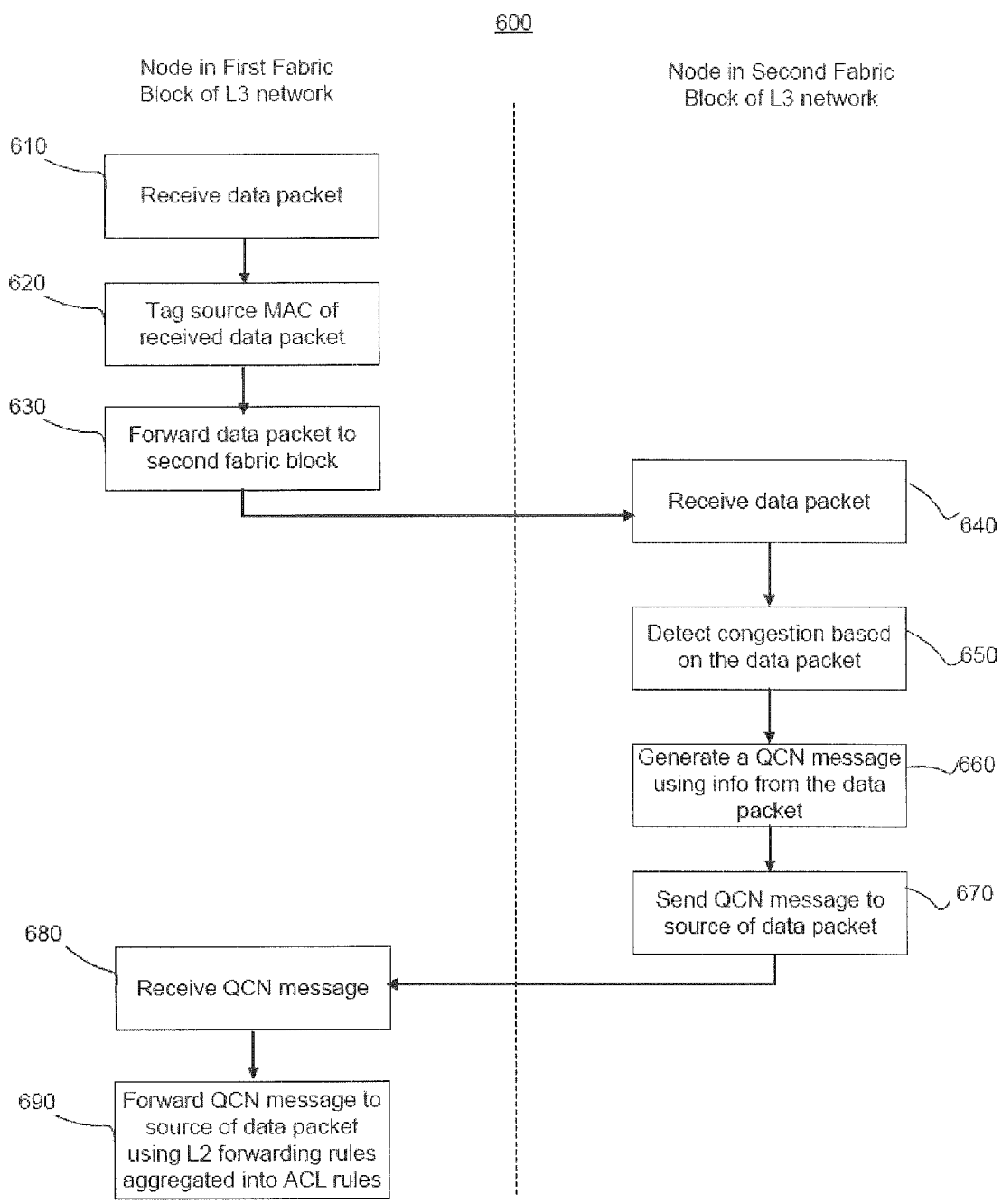
FIG. 6 is a flow diagram of an example method according to aspects of the disclosure.

FIG. 6 illustrates a method 600 for congestion notification in L3 networks using an L2 forwarding overlay. The method 600 may be performed by, for example, any L3 switch in the network.

In block 610, a data packet is received at a first node in a first fabric block of the L3 network. The first node may be, for example, a TOR switch, an edge router, or any other switch coupled directly or indirectly to a host device from which the data packet is received.

In block 620, the first node of the first fabric block performs source MAC tagging on the data packet. For example, the first node may rewrite header information in the data packet to uniquely identify the first node and/or the first fabric block. The header information may be a source address field of the data packet, and the first node may rewrite its own source MAC address into that field. Further nodes that receive the data packet may be programmed to maintain the source MAC tag, such as by not rewriting the source address header field.

In block 630, the first node forwards the data packet to a second fabric block. In forwarding the data packet, the data packet may traverse one or more additional switches in the first fabric block before reaching the second fabric block. For example, if the first switch that performs the source MAC tagging resides in a middle or lower tier of a hierarchy in the first fabric block, the data packet may be sent to one or more intermediate nodes in higher tiers of the first fabric block before being sent to the second fabric block through an inter-block network.

In block 640, the tagged data packet is received at a second node in a second fabric block of the L3 network. As mentioned above, the second node may identify the data packet as originating from the first fabric block based on the tagged source MAC address. Moreover, the second node may be programmed to maintain the tagged source MAC address of the data packet.

In block 650, the second node detects whether it is congested based on, for example, the received data packet. For example, the second node may be receiving data packets faster than it can send them out. Accordingly, a throughput of the second node and of the overall network may be decreased as compared to a throughput if the second node was running efficiently.

In block 660, the second node generates a quantized congestion notification (QCN) message if it determines that it is congested. The generated QCN message may include information from the received data packet. For example, the QCN message includes a source IP address in its payload, the source IP address identifying a source of the congestion (e.g., the host in the first fabric block that sent the data packet). The QCN message also includes a destination MAC address, which is the tagged source MAC address of the first node in the first fabric block.

In block 670, the second node in the second fabric block sends the QCN message to the source of the data packet. For example, because the destination MAC of the QCN message is the source MAC of the data packet, any intermediate nodes in the second fabric block receiving the QCN message will recognize the source MAC as being from the first fabric block. Accordingly, the intermediate nodes will L2 forward the QCN message to a node, such as an edge router, in the first fabric block.

In block 680, the QCN message is received by the first node in the first fabric block. If the first node is an edge router in the first fabric block, it may be the first node in the block to receive the QCN message. However, if the first node is in a lower tier of the hierarchically arranged switches in the first fabric block, the edge router and/or intermediate nodes of the first fabric block may forward the QCN message to the first node using techniques described below in connection with block 690.

In block 690, the first node forwards the QCN message to the source of the data packet using L2 forwarding rules aggregated into ACL rules. For example, user-defined fields in an ACL table may include the source IP address of the data packet. Accordingly, the first node may perform ACL lookup by matching the source IP address of the QCN message with the user-defined field of the ACL table.

It should be understood that the operations involved in the above methods need not be performed in the precise order described. Rather, various operations may be handled in a different order or simultaneously, and operations may be added or omitted.

The systems, methods, and examples described above are advantageous in that they provide for congestion notification in L3 networks. As such, traffic sources causing congestion may be notified of such congestion and adapt accordingly, such as by changing their transmission rate or routes. Accordingly, a number of packet drops in the network may be reduced significantly. Additionally, a round trip time of data center traffic is also greatly reduced.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    receiving a data packet at a first switch in a first fabric block of an Layer 3 (L3) network;
    rewriting, by the first switch, information in a header of the data packet to identify at least one of the first switch and the first fabric block, wherein the information is not further modified by other switches forwarding the data packet;
    forwarding the data packet to a second switch in a second fabric block of the L3 network;
    determining, by the second switch in response to receiving the data packet, whether the second switch is congested;
    generating, at the second switch in response to the detected congestion, a notification message;
    forwarding the notification message to the first switch; and
    forwarding the notification message from the first switch to a source of the data packet.

2. The method of claim 1, further comprising copying header information for the notification message generated by the second switch from the header information of the data packet.

3. The method of claim 2, wherein the copying the header information comprises copying a source address of the data packet into a destination address of the notification message.

4. The method of claim 1, wherein the notification message is Layer 2 (L2) forwarded from the second switch to the first switch.

5. The method of claim 4, further comprising aggregating Layer 2 (L2) forwarding rules of the data packet into a set of access control list rules.

6. The method of claim 5, wherein forwarding the notification message from the first switch to the source comprises using access control list matching of a payload of the notification message.

7. The method of claim 6, wherein the matching is based on an address of the source included in the notification message payload.

8. A method, comprising:
    receiving a data packet at a first switch in a first fabric block of an Layer 3 (L3) network;
    rewriting, by the first switch, information in a header of the data packet to identify at least one of the first switch and the first fabric block, wherein the information is not further modified by other switches forwarding the data packet;
    forwarding the data packet to a second switch;
    receiving a congestion notification message from the second switch; and
    forwarding the notification message from the first switch to a source of the data packet.

9. The method of claim 8, wherein the notification message is forwarded from the first switch to the data packet source using L3 rules aggregated from Layer 2 (L2) Quantized Congestion Notification (QCN) forwarding rules.

10. The method of claim 9, wherein the L3 rules include access control list (ACL) rules.

11. The method of claim 10, wherein forwarding the notification message from the first switch to the source comprises using access control list matching of a payload of the notification message.

12. The method of claim 11, wherein the matching is based on an address of the source included in the notification message payload.

13. The method of claim 10, wherein a user defined field of the access control list (ACL) rules includes a source internet protocol address of the received data packet.

14. A method, comprising:
    receiving a data packet at a switch in a second fabric block of a Layer 3 (L3) network from a first switch in a first fabric block of the L3 network, wherein a header of the received data packet includes information that identifies at least one of the first switch and the first fabric block and the information is not further modified by other switches forwarding the data packet;
    determining, by the second switch in response to receiving the data packet, whether the second switch is congested;
    generating, at the second switch in response to the detected congestion, a notification message;
    forwarding the notification message to a source of the data packet.

15. The method of claim 14, further comprising copying header information for the notification message generated by the second switch from the header information of the data packet.

16. The method of claim 15, wherein the copying the header information comprises copying a source address of the data packet into a destination address of the notification message.

17. The method of claim 14, wherein the notification message is Layer 2 (L2) forwarded from the second switch to the first switch.

18. The method of claim 17, further comprising aggregating Layer 2 (L2) forwarding rules of the data packet into a set of access control list rules.

19. The method of claim 18, wherein forwarding the notification message from the first switch to the source comprises using access control list matching of a payload of the notification message.

20. The method of claim 19, wherein the matching is based on an address of the source included in the notification message payload.

* * * * *